United States Patent
Kirby et al.

(10) Patent No.: US 9,949,083 B1
(45) Date of Patent: Apr. 17, 2018

(54) PRECISE, HIGH COVERAGE, LOCATION SYSTEM

(71) Applicant: Cisco Technology, Inc., San Jose, CA (US)

(72) Inventors: Shaun Kirby, Pasadena, CA (US); Justin J. Muller, San Jose, CA (US); Jagadish Chundury, Bangalore (IN); Victor T. To, Sunnyvale, CA (US); Santosh G. Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/296,349

(22) Filed: Oct. 18, 2016

(51) Int. Cl.
| | |
|---|---|
| H04M 11/04 | (2006.01) |
| H04W 4/00 | (2009.01) |
| H04W 24/00 | (2009.01) |
| H04W 4/02 | (2018.01) |
| H04B 5/00 | (2006.01) |
| G01S 15/06 | (2006.01) |

(52) U.S. Cl.
CPC ............ H04W 4/023 (2013.01); G01S 15/06 (2013.01); H04B 5/0062 (2013.01)

(58) Field of Classification Search
CPC H04W 64/00; H04W 4/04; G01S 5/02; G01S 5/0252
USPC .................. 455/404.2, 422.1, 456.1; 370/338
See application file for complete search history.

(56) References Cited

U.S. PATENT DOCUMENTS

| | | | |
|---|---|---|---|
| 7,406,116 B2* | 7/2008 | Agrawala | H04W 64/00 342/357.29 |
| 8,174,931 B2 | 5/2012 | Vartanian et al. | |
| 8,204,512 B2* | 6/2012 | Dietrich | G01S 5/02 370/338 |
| 8,284,100 B2 | 10/2012 | Vartanian et al. | |
| 8,674,826 B2 | 3/2014 | Becker et al. | |
| 8,938,255 B2* | 1/2015 | Tsruya | G01S 5/0252 455/404.2 |
| 9,338,609 B2 | 5/2016 | Heydlauf | |
| 9,661,604 B1* | 5/2017 | O'Shea | H04W 24/10 |

(Continued)

OTHER PUBLICATIONS

Ruoxi Jia, et al., "MapSentinel: Can the Knowledge of Space Use Improve Indoor Tracking Further?", Sensors 2016, 6, 472; doi:10.3390/s16040472, www.mdpi.com/journal/sensors, Apr. 2, 2016, 19 pages.

*Primary Examiner* — William D Cumming
(74) *Attorney, Agent, or Firm* — Edell, Shapiro & Finnan, LLC

(57) ABSTRACT

A system and method for improved location tracking of a target device based on location estimates for multiple types of location technologies/sensor types. A received signal strength location estimate of a target device based on wireless transmissions made by the target device received at a plurality of receiver devices at known locations in a location region. A first search area for the target device is derived based on the received signal strength location estimate. An ultrasound based area in which the target device is estimated to be is derived based on reception by the target device of a particular ultrasound beacon in the location region. An intersection of the first search area and the ultrasound based area is computed to produce a second search area. A location estimate of the target device in the second search area is computed based at least on the received signal strength location estimate.

21 Claims, 8 Drawing Sheets

(56) References Cited

U.S. PATENT DOCUMENTS

| | | | |
|---|---|---|---|
| 2005/0243936 A1* | 11/2005 | Agrawala | H04W 64/00 375/259 |
| 2009/0190441 A1* | 7/2009 | Zhao | G01S 5/30 367/128 |
| 2010/0090899 A1* | 4/2010 | Zhao | G01S 5/0252 342/387 |
| 2011/0195701 A1* | 8/2011 | Cook | G01S 5/0018 455/422.1 |
| 2013/0035109 A1* | 2/2013 | Tsruya | G01S 5/0252 455/456.1 |
| 2014/0074667 A1 | 3/2014 | Smith | |
| 2016/0309303 A1* | 10/2016 | Svener | H04W 4/04 |

* cited by examiner

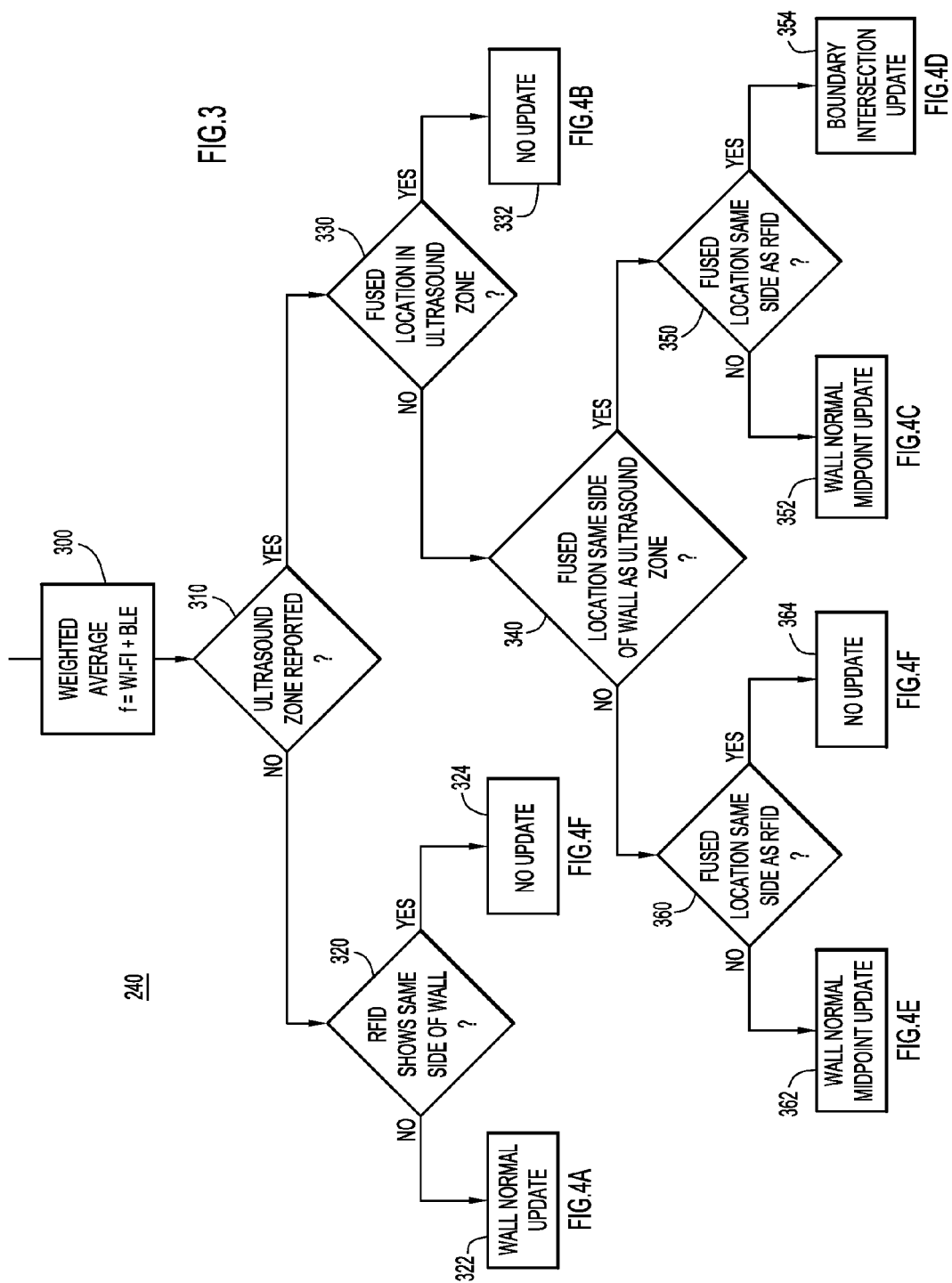

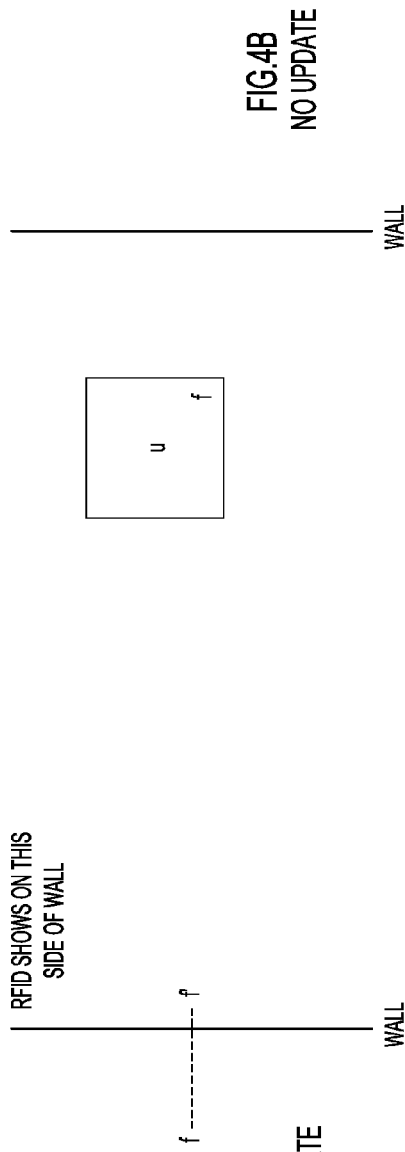
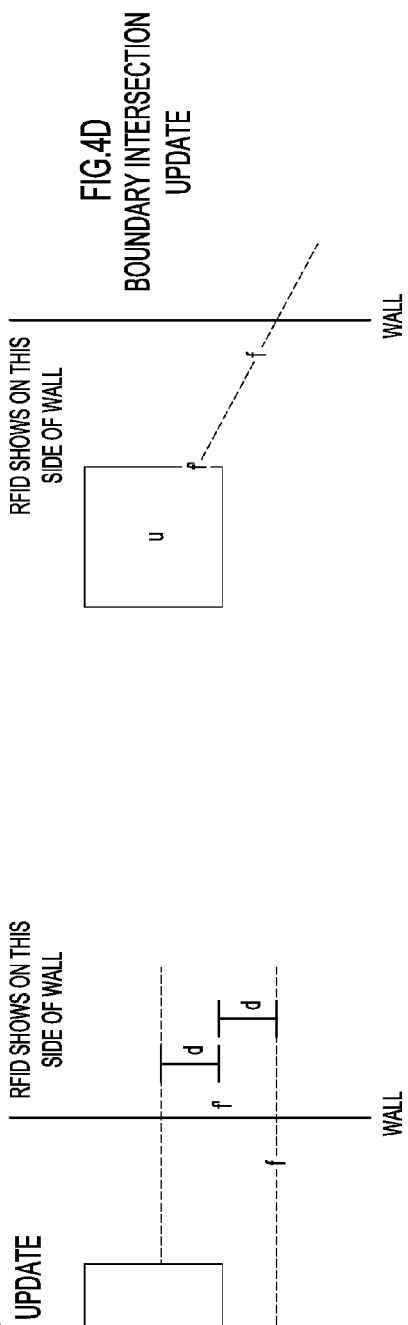
FIG.4A WALL NORMAL UPDATE
FIG.4B NO UPDATE
FIG.4C WALL NORMAL MIDPOINT UPDATE
FIG.4D BOUNDARY INTERSECTION UPDATE

NO UPDATE

WALL NORMAL
MIDPOINT UPDATE

PRECISE, HIGH COVERAGE, LOCATION SYSTEM

TECHNICAL FIELD

The present disclosure relates to wireless location systems.

BACKGROUND

The ability to locate and track objects yields tremendous business value in any industry. However, location with enough precision to solve business problems remains difficult in many environments, such as manufacturing facilities with high ceilings, pervasive Radio Frequency (RF) interference, and ever shifting visual occlusion in crowded and often chaotic spaces.

BRIEF DESCRIPTION OF THE DRAWINGS

FIG. 3 is a flow chart depicting, in more detail, operations of a fusion step of the process depicted in FIG. 2, according to an example embodiment.

FIGS. 4A-4F illustrate example scenarios that are addressed in the operations depicted in FIG. 3, according to an example embodiment.

DESCRIPTION OF EXAMPLE EMBODIMENTS

Overview

Figure 1:
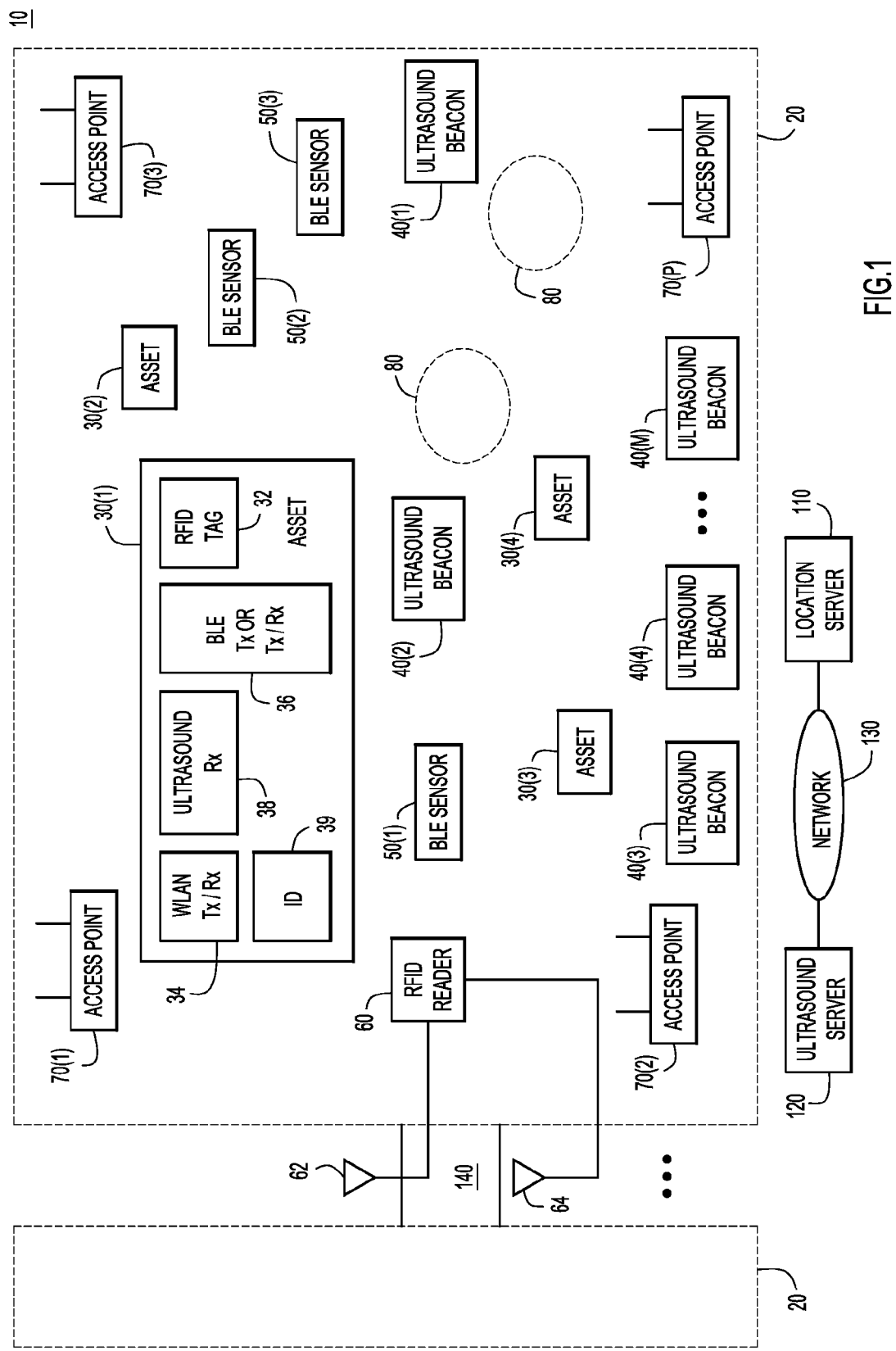
FIG. 1 is a block diagram of a location system, according to an example embodiment.

In one embodiment, a system and method are provided for improved location tracking of a target device based on location estimates for multiple types of location technologies/sensor types. A received signal strength location estimate of a target device is based on wireless transmissions made by the target device that are received at a plurality of receiver devices at known locations in a location region. A first search area for the target device is derived based on the received signal strength location estimate. An ultrasound based area in which the target device is estimated to be is derived based on reception by the target device of a particular ultrasound beacon in the location region. An intersection of the first search area and the ultrasound based area is computed to produce a second search area. A location estimate of the target device in the second search area is computed based at least on the received signal strength location estimate.

Example Embodiments

Presented herein is a location system and method that uses a plurality of different types of sensors and corresponding tagged assets to maximize the usefulness of the sensors and their complementarity and create a hierarchical location scheme. Generally, the method involves capturing location data from multiple sensors, normalizing the location data into a common data store, and evaluating a set of configurable rules on the captured location data to arrive at an improved prediction of the actual locations of the tagged assets. Different environments may use a different set of rules to achieve the best accuracy. For example, a weight associated with each set of locations can (or may need to) change to improve the accuracy.

While advances in Wi-Fi location have increased, there are still many cases where Wi-Fi location does not provide enough location precision to solve business problems like finding tools, monitoring workforce logistics or locating parts or retail items. Other location technologies such as Bluetooth®, Radio Frequency Identification (RFID), Ultra-wideband (UWB), and ultrasound have been used, but no one technology alone has been able to realize the full potential value of object location in all cases. In general, Wi-Fi-based receiver/tags are relatively expensive and operational time can be limited compared to lower cost Bluetooth Low Energy (BLE) devices.

Consider the following technical challenges that can be present in a given environment where a target device/asset needs to be located and tracked:

Large open spaces of more than 100 meters×100 meters with no viable mount points for receivers except around the perimeter.

High ceilings (greater than 25 meters, for example) and likely lack of power source makes mounting receivers in the ceiling not feasible.

Ground based mounting likely not an option as well due to lack of power as well as large objects that need to move across the surface.

Large metal objects in the space create strong RF interference as well as reflections.

Objects to be tracked usually do not have a power source. Passive devices or devices requiring very low power consumption emitting signals for location calculation may be attached to the objects to be tracked.

Power and network connectivity to sensors may not always be available where the sensors are best deployed.

High power consumption active RFID, IEEE 802.11/Wi-Fi based sensors alone will not always be sufficient to provide location services. Each type of sensor by itself has deficiencies in various parts of challenging environments, regardless of the accuracy achievable in a less challenging environment.

The system and methods presented use multiple location technologies, such as Wi-Fi, Bluetooth Low Energy (BLE), RFID, and ultrasound, to increase accuracy, pervasiveness of coverage, and speed of location in venues where location is challenging.

Reference is first made to FIG. 1. FIG. 1 illustrates a system 10 that includes a plurality of sensors of different types deployed within a location region 20. The location region 20 is a physical space within which one or more assets/objects (also called target devices) are to be located and whose location is to be tracked over time. For example, FIG. 1 shows assets 30(1), 30(2), 30(3) and 30(4) that are mobile within the location region 20. Also deployed in the location region 20 are a plurality of ultrasound beacons 40(1)-40(M), Bluetooth Low Energy Sensors 50(1)-50(3), an RFID system that includes an RFID reader 60 and two (or more) RFID antennas 62 and 64, and a plurality of WLAN access points 70(1)-70(P). The ultrasound beacons 40(1)-40

(M) transmit ultrasound signals that are received by receiver tags on the assets 30(1). Conversely, the BLE sensors/receivers 50(1)-50(3) receive BLE signals from BLE beacons/transmitters on the assets. Thus, as shown in FIG. 1, each asset may include a radio frequency identifier (RFID) tag 32, a wireless local area network (WLAN)/Wi-Fi transceiver 34, BLE beacon/transmitter or transceiver 36 and ultrasound receiver 38. Each asset or target device has a device identifier 39 that can be correlated directly with sensor-based positioning regardless of device density. In other words, the asset identifier is an identifier in an asset management system that can be correlated with any tag(s) and/or sensor(s) assigned to that asset to track it according to the methods presented herein. The asset identifier 39 may be an RFID tag identifier maintained by the RFID tag 32.

Furthermore, within location region 20 there are one or more sub-regions 80 that are designated as restricted zones where detection of a location of a particular asset is important for any of a variety of reasons, including safety. Moreover, there may be multiple such location regions adjacent to each other and it is desirable to determine within which location region an asset is located.

FIG. 1 further shows that there is a location server 110 and an ultrasound server 120. The ultrasound server 120 "sits behind" the location server 110 and provides ultrasound region information to a fusion function of the location server 110. The location server 110 is connected to the access points 70(1)-70(P) by a network 130, for example. Likewise, the ultrasound server 130 communicates with the ultrasound beacons 40(1)-40(M) and the ultrasound receivers on the assets by the network 130. For simplicity, the connections from the access points 70(1)-70(P) to the network 130 is not shown in FIG. 1. The location server 110, ultrasound server 120, RFID reader 60 and BLE sensors 50(1)-50(3), and asset tags all connect to network 130 to enable communication between each other. In one embodiment, a single "tag" or device of an asset 30(1)-30(4) is configured to receive both Wi-Fi signals and ultrasound signals and to send WLAN/Wi-Fi location related data and ultrasound location related data to the location server 110.

In one embodiment, a hierarchical location scheme is presented herein. The ultrasound beacons 40(1)-40(M) may be positioned around the location region 20 so as to locate an asset within a boundary very accurately. The boundary can be a virtual boundary, or a physical room which will restrict ultrasound beacons. The virtual boundary can also be a more complex shape bounded by horizontal and vertical straight lines, e.g. a cross, plus sign or a T- or L-shape. It may also be possible to create more complex polygons by adjusting the rotation angle of the ultrasound beacons 40(1)-40(M) so that they are not all pointing north, for example.

The room/boundary information may be very reliable but is not granular for an accurate location. Accurate location within the boundary can then be carried out using additional location techniques, such as high-fidelity WLAN received signal strength location techniques.

This has several advantages. First, it reduces the search area for complex location schemes and hence reduces the location calculation time. Second, it increases the reliability of the computed location since ultrasound provides a reliable boundary.

Complementing WLAN location with ultrasound location can increase location accuracy in important areas in challenging environments, e.g. to improve worker safety around machines in a factory or to pinpoint a shopper next to a shelf.

For example, one such environment may have wide open spaces, high ceilings, and pervasive metal interference. WLAN access points are used sparsely around the perimeter of such a region to provide connectivity and a baseline level of location accuracy (e.g., measured at around 30 m) throughout the venue. BLE sensors are also deployed around the perimeter to enhance the baseline location accuracy throughout. In areas where more precision is required and RF interference is significant, ultrasound zones may be created using ultrasound beacons. Examples of such areas include the sub-regions 80 where using the wrong type of machinery can damage other equipment or lead to injury, such as around the nose, engines, and tail of an aircraft being serviced.

Finally, to be able to know more precisely if an asset is in a particular area of location region 20, RFID may be used as a tripwire at smaller passages into and out of one location region, as shown at reference numeral 140 in FIG. 1. The tripwire is created with the two RFID antennas 62 and 64, one on each side of the passageway or other building structure 140 between location regions. The interrogation strength and read sensitivity of the antennas 62 and 64 are tuned so that assets are seen by only one antenna at a time and so that an asset passing from one side of the tripwire (across the passageway between location regions) to the other is always seen by both antennas. The use of RFID sensors achieves location accuracy as precise as a few meters, and can be useful to avoid a mistaken determination that an asset is on one side of a long building structure (e.g., a wall), when it is actually on the other side, leading to time wasted walking all the way around to the other side of the long wall. With the RFID tripwires across passages through the wall, a more definitive determination can be made as to which side of the wall the object is located on. Thus, by positioning Wi-Fi/WLAN access points, BLE sensors, ultrasound beacons, and RFID antennas to play to their strengths and complement one another, improved location accuracy can be achieved.

Figure 2:
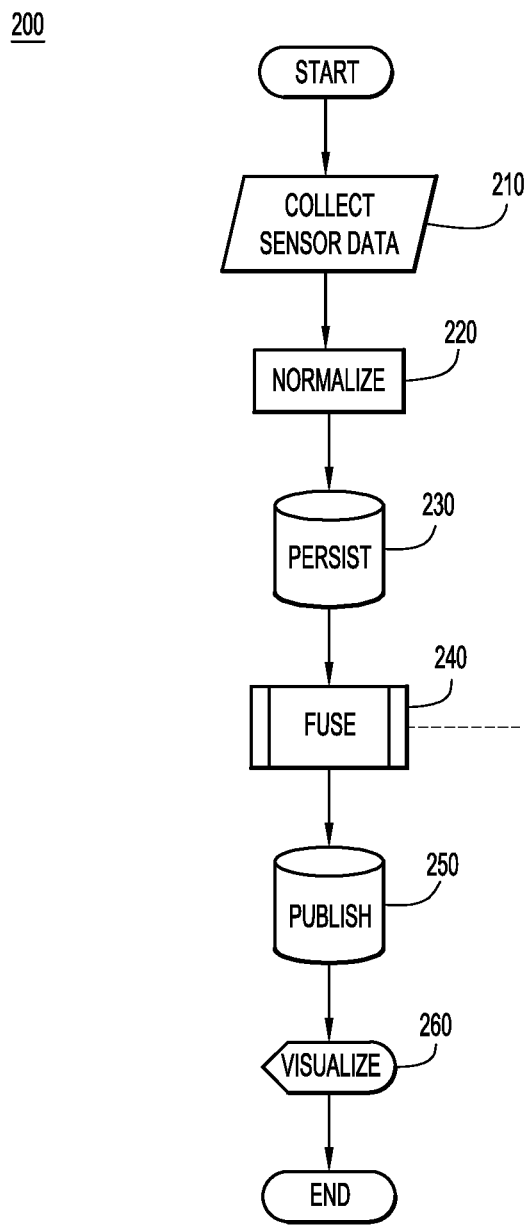
FIG. 2 is a flowchart generally illustrating a process flow used in the location system, according to an example embodiment.

Reference is now made to FIG. 2 for a description of a process 200, according to an example embodiment. Reference is also made to FIG. 1 for purposes of the description of the process 200. At 210, a sensor data collection is made. Data from the different sensors shown in FIG. 1 is collected and received at the location server 110.

At 220, a data normalization operation is performed. Data normalization involves calibrating/adjusting the location data received from the various location sensors to a common location standard, e.g., a Global Positioning System (GPS) standard (coordinate system or location grid, such as (x,y) coordinates in feet from a corner of a location region). The boundary points of the ultrasound zones and the RFID tripwires are also recorded using the same GPS standard. Connectors to the different types of sensors could perform the normalization operations, and sensor location reports could be normalized to any desired location grid.

At 230, the normalized information is persisted (stored) in a common aggregation store managed by (and part of) the location server 110.

At 240, a data fusion operation is performed in which rules are applied on the aggregated data to determine a mostly likely location of the asset of interest. This fusion operation is described in more detail hereinafter in connection with FIGS. 3 and 4A-4F.

At 250, the location estimate as derived in operation 240 is published to a store of current locations for real-time visualization.

At 260, an asset visualizer operation generates display data to display the location of tracked assets and allows users to explore attributes of the tracked objects, such as data obtained from enrichment with asset management or business systems. Alerts and notifications about important business events such as the presence of an object in a danger zone or the passage from one space to another across a tripwire can also be shown on the visualizer.

Reference is now made to FIGS. 3 and 4A-4F for a description of the data fusion operation 240 in more detail.

At 300, normalized location reports from WLAN location and BLE beacons are combined in a location dependent weighted average to minimize the expected error in the resulting location:

$$f=W(wf)*wf+B(b)*b$$

where f is the fused location coordinates, wf is the WLAN reported location coordinates, b is the BLE reported location coordinates, and W and B are (location dependent) weight matrices. The WLAN reporting location coordinates may be based on receive signal strength information (RSSI) measurements made by a plurality of APs 70(1)-70(P).

At 310, it is determined whether the ultrasound sensors indicate that an ultrasound zone is reported.

Figure 4F:
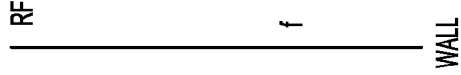

If an ultrasound zone is not reported, then the path to the left in FIG. 3 is taken, to step 320. At 320, it is determined whether the RFID reported location indicates that the asset is on the same side of the wall (with respect to which the RFID reader and antennas are positioned to detect). While this description refers to a "wall", this is not meant to be limiting and it is applicable to any building structure, such as an elongated structure, which need not necessarily extend from floor to ceiling. If the latest RFID detection event shows that the asset is on the opposite side of the wall from the fused location, f, then, at 322, the fused location is updated/modified to the point f on a line from the original fused location normal to the wall, just on the correct side of the wall, as shown in FIG. 4A. Otherwise, at 324, the fused location, f, of the asset is passed to the publication step 250 (FIG. 2) with no location update. This scenario is depicted in FIG. 4F.

If, at 310, it is determined that ultrasound location reports indicate that an ultrasound zone is reported, the path on the right of FIG. 3 is taken, to step 330. At 330, it is determined whether the fused location, f, is in an ultrasound zone. If the fused location, f, is in the ultrasound zone, then at 332 it is passed to the publication step 250 (FIG. 2), regardless of the RFID indication. In other words, WLAN+BLE+Ultrasound outweighs/overrides the RFID location. This is shown in FIG. 4B, where u is the ultrasound zone.

If the fused location, f, is not in the ultrasound zone then the path to step 340 is taken. At 340, it is determined if the fused location, f, is on the same side of the wall as the ultrasound zone. If the fused location, f, is not in the ultrasound zone but is on the same side of the wall as the ultrasound zone, then the path to 350 is taken, where it is determined whether the fused location is on the same side of the wall as the latest RFID detection event. If the latest RFID detection event indicates that the asset is on the opposite side of the wall as the fused location, f, then at 352, the fused location is updated to the point f that is just on the correct side of the wall (as indicated by the more trusted RFID location) and mid-way between the intersections with the wall of the perpendicular lines from the fused location f and the centroid of the ultrasound zone, u, to the wall. This is shown in FIG. 4C.

If the latest RFID event shows an object is on the same side of the wall as the fused location, f, then at 354, the fused location is updated to the point f on the boundary of the ultrasound zone and on the line between the fused location f and the centroid of the ultrasound zone, u. This is shown in FIG. 4D.

Figure 4E:
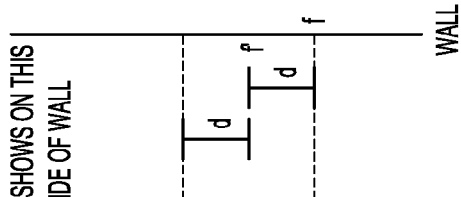

If the fused location, f, is not in the ultrasound zone and is on the opposite side of the wall as the ultrasound zone, then that path from 340 goes to operation 360. If the latest RFID event shows the object is on the opposite side of the wall as the fused location, f, then at 362, the fused location is updated to the point f that is just on the correct side of the wall (as indicated by the more trusted RFID) and mid-way between the intersections with the wall of the perpendicular lines from the fused location f and the centroid of the ultrasound zone, u, to the wall. This is shown in FIG. 4E.

Conversely, if the latest RFID event shows that the asset is on the same side of the wall as the fused location, f, then at 364, the fused location is passed to the publication step 250 (FIG. 2) with no update. This is shown in FIG. 4F.

Figure 5:
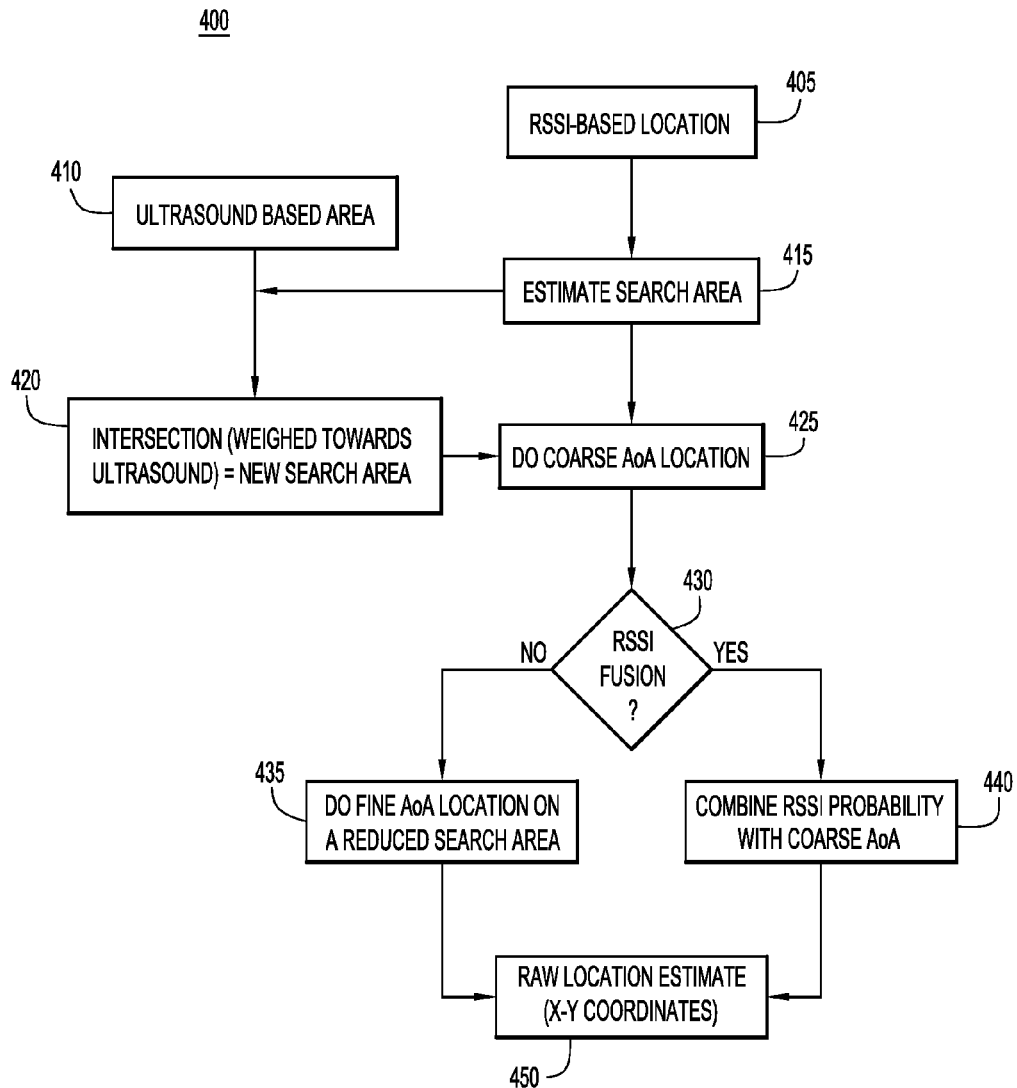
FIG. 5 is a flow chart that illustrates an example in which ultrasound is used to narrow down a search area for other location techniques, according to an example embodiment.

FIG. 5 is a flow chart that, at a higher-level, illustrates how a WLAN location, in combination with ultrasound, can yield a highly precise location. The WLAN location estimate may be determined based on received signal strength information (RSSI) obtained from transmissions made by a target device that are received at a plurality of WLAN APs and angle-of-arrival (AoA) location estimation. AoA location estimation involves determining the angle at which a wireless signal is received from a target device at each of a plurality of antennas of an AP. Each antenna has an angle-of-arrival and the AoA data across all antennas is normalized to produce a true direction or AoA for the signal received by that AP.

The process 400 shown in FIG. 5 involves improving an RSSI-based location estimate using ultrasound. At 405, an RSSI-based location estimate is obtained using any of a variety of RSSI location techniques now known or hereinafter developed. At 410, an ultrasound based area is determined. The ultrasound based area is the area that the target asset is estimated to be in, if the target asset has heard a particular ultrasound beacon. At 415, an estimate is made of a search area using the RSSI-based location. Step 415 helps bound AoA outliers. At 420, a new search area is computed based on an intersection between the ultrasound search area determined at 410 and the search area estimated at 415 using the RSSI-based location. The intersection may be weighted towards the ultrasound area in case the intersection leads to a null set or a small area (less than a certain dimension or square feet/meter area).

Using the new search area determined at 420, in step 425, a coarse angle-of-arrival (AoA) location estimate is made. The AoA estimate at 425 is made on a coarse grid and is useful to reduce computations. At 430, it is determined whether to fuse the RSSI estimate with the AoA location estimate. In other words, it is determined whether the coarse AoA estimate is good enough, for example, by thresholding the variance of multiple AoA estimate samples that are averaged into the coarse AoA estimate.

If, at 430, it is determined that the coarse AoA location is not good enough, then, at 435, a finer AoA location estimate is made on a reduced search rectangle or other area shape. On the other hand, if the coarse AoA is determined to be good enough, then at 440, the RSSI location is combined with the coarse AoA.

At 450, a raw location estimate is computed, either using the fine AoA location of step 435 or the coarse AoA location of step 440.

Figure 6:
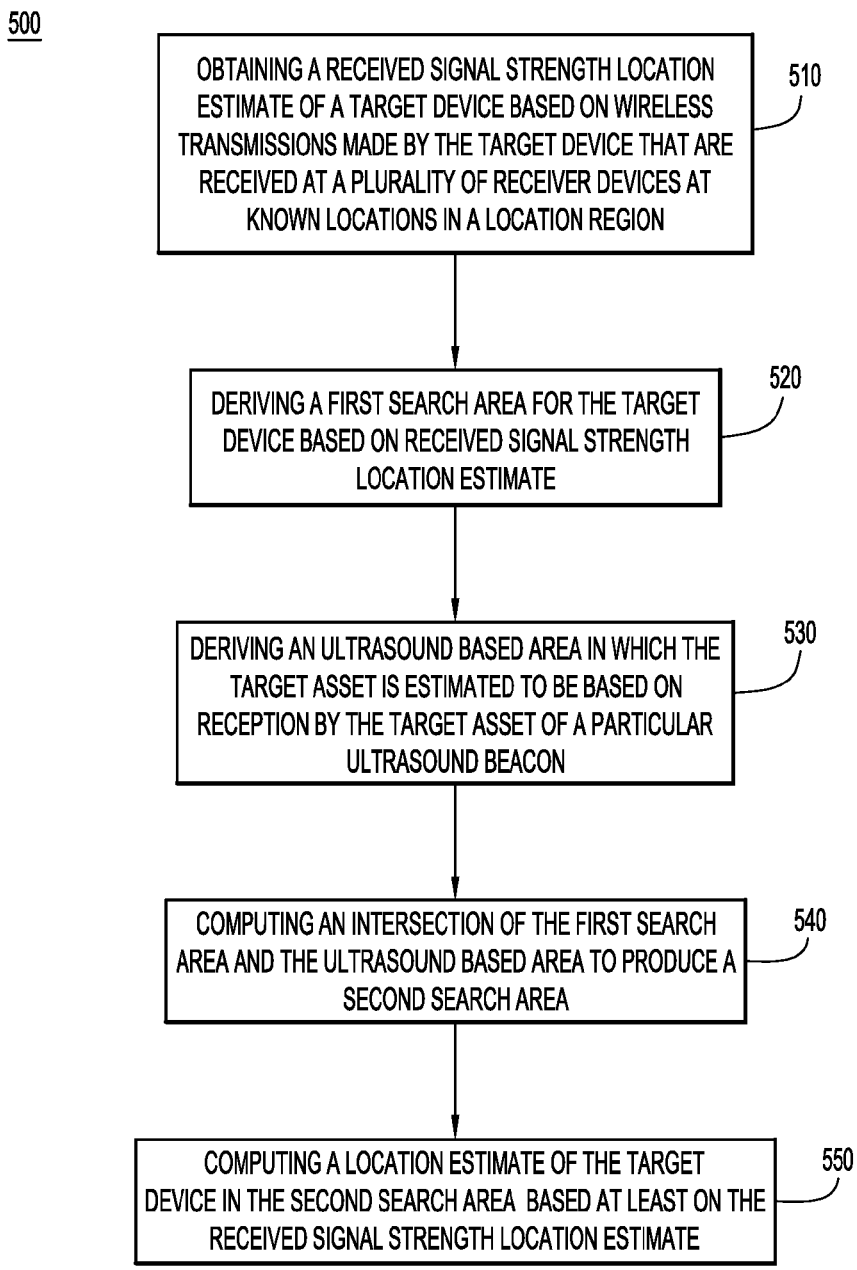
FIG. 6 is a flow chart generally depicting a location process according to an example embodiment.

Reference is now made to FIG. 6 for a description of an overall flow diagram of a process 500 that combines the techniques depicted in FIGS. 2-5. At 510, a received signal strength location estimate of a target device is obtained based on wireless transmissions made by the target device that are received at a plurality of receiver devices at known locations in a location region. This is performed by, for example, the APs 70(1)-70(P) shown in FIG. 1. At 520, a first search area for the target device is derived based on received signal strength location estimate. At 530, an ultrasound based area in which the target device is estimated to be is derived based on the reception by the target device of a particular ultrasound beacon. For example, whether the target device is in an ultrasound based area may be determined based on whether the target asset received an ultrasound transmission from one of the ultrasound beacons 40(1)-40(M) in FIG. 1. At 540, an intersection of the first search area and the ultrasound based area is computed to produce a second search area. At 550, a location estimate of the target device in the second search area is computed based at least on the received signal strength location estimate.

As explained above, the method may further include computing a first angle-of-arrival location estimate of the target device in the second search area based on a wireless signal received from the target device at each of a plurality of antennas of the plurality of receiver devices, and wherein computing the location estimate of the target device is based on the received signal strength location estimate and the first angle-of-arrival location estimate.

When the first AoA estimate is a relatively coarse estimate, the method further involves determining whether the first angle-of-arrival location estimate has sufficient accuracy. When it is determined that the first angle-of-arrival location estimate has sufficient accuracy, the received signal strength location estimate is combined with the first angle-of-arrival location estimate to produce a location estimate of the target device.

When it is determined that the first angle-of-arrival location estimate does not have sufficient accuracy, the method may further include: generating a second angle-of-arrival location estimate on a reduced search area compared to that used for the first angle-of-arrival location estimate; and combining the received signal strength location estimate with the second angle-of-arrival location estimate to produce a location estimate of the target device.

As described above in connection with FIGS. 1-6, the received signal strength location estimate may be a first location measurement of the target device and a second location measurement may be based on the ultrasound based area. A third location measurement of the target device may be obtained that is based on short-range low energy wireless beacon sensors, and a fourth location measurement of the target device may be obtained that is based on a detection event from a radio frequency identification (RFID) reader position in the location region to detect the target device on opposite sides of a wall. In this case, computing the location estimate may involve computing a fused location estimate based on a weighted combination of the first location measurement and the third location measurement.

As described above in connection with FIGS. 3 and 4A-4F, when it is determined that the target device is not estimated to be in the ultrasound based area, the method may further involve determining whether the fourth location measurement of the target device indicates that the target device is on a same side of a building structure as the RFID reader. When the fourth location measurement of the target device indicates that the target device is on an opposite side of the building structure from the fused location estimate, computing the location estimate may involve comprises modifying the fused location estimate as being on a line from the fused location estimate normal to the building structure but on a correct sided of the building structure.

When it is determined that the target device is estimated to be in the ultrasound based area, the method may further include: determining whether the fused location estimate is in the ultrasound based area; and if the fused location estimate is in the ultrasound based area, using the fused location estimate without modification. If the fused location estimate is not in the ultrasound based area but is on a same side of a building structure as the ultrasound based area, the method may further include: determining whether the fused location estimate is on a same side of the building structure as the RFID reader.

Furthermore, the method may further include: modifying the fused location estimate to be at a point that is on a correct side of the building structure approximately mid-way between intersections with the building structure of perpendicular lines from the fused location estimate and a centroid of the ultrasound based area, when it is determined that the fused location estimate is not on the same side of the building structure as the RFID reader; and modifying the fused location estimate to be at a point on a boundary of the ultrasound based area and on a line between the fused location estimate and a centroid of the ultrasound based area when it is determined that the fused location estimate is on the same side of the building structure as the RFID reader.

Similarly, if the fused location estimate is not in the ultrasound based area but is on an opposite side of a building structure as the ultrasound based area, the method may further include: modifying the fused location estimate to be at a point that is on a correct side of the building structure approximately mid-way between intersections with the building structure of perpendicular lines from the fused location estimate and a centroid of the ultrasound based area, when it is determined that the fused location estimate is not on the same side of the building structure as the RFID reader; and not modifying the fused location estimate when it is determined that the fused location estimate is on the same side of the building structure as the RFID reader.

Figure 7:
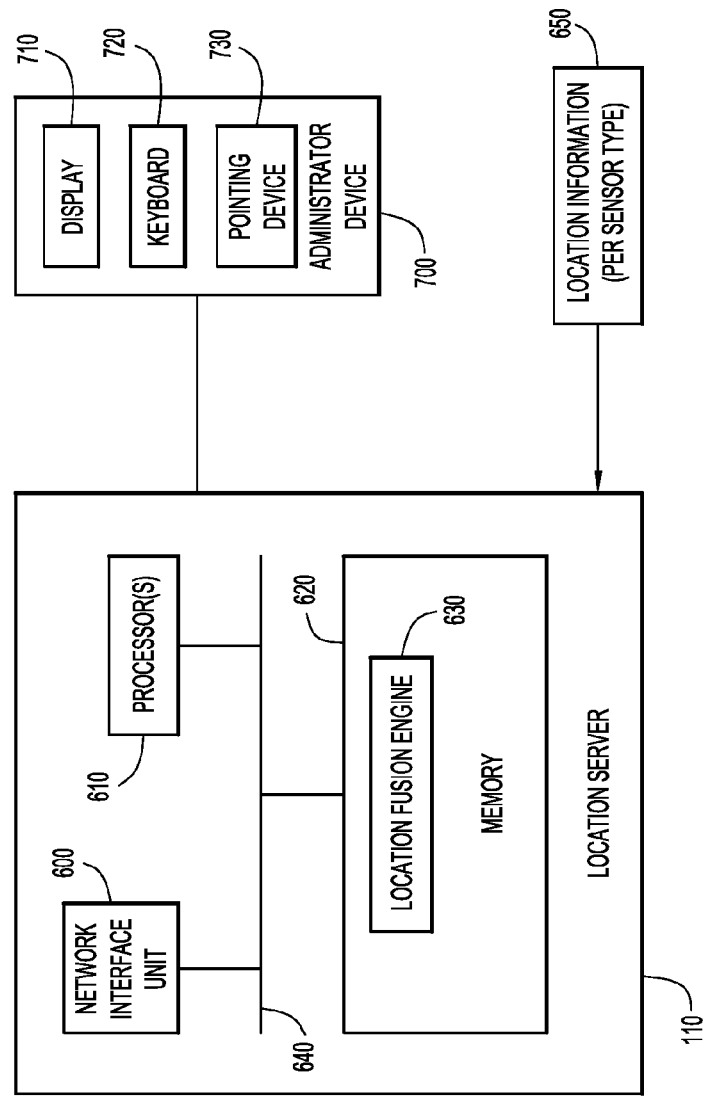
FIG. 7 illustrates a block diagram of a location server that is used for computing location estimates, and which may distribute computed location information to one or more devices used by an administrator user, according to an example embodiment.

Reference is now made to FIG. 7. FIG. 7 shows a block diagram of location server 110 according to an example embodiment. In one form, location server 110 is a computing apparatus that has network connectivity. To this end, the location server 110 may include a network interface unit 600 (e.g., one or more network interface cards) that enables network connectivity, one or more processors 610 and memory 620. The memory 620 stores instructions for location fusion engine software 630.

The memory 620 may include read only memory (ROM), random access memory (RAM), magnetic disk storage media devices, optical storage media devices, flash memory devices, electrical, optical, or other physical/tangible memory storage devices. Thus, in general, the memory 620 may comprise one or more tangible (non-transitory) computer readable storage media (e.g., a memory device) encoded with software comprising computer executable instructions and when the software is executed (by the processor 110) it is operable to perform the operations described herein. In particular, the location server 110 performs the operations described above in connection with FIGS. 1-6 when executing the location fusion engine software 630 stored in memory 620.

The location server 110 includes a bus 640 or other communication mechanism for communicating information. While the figure shows a single block 1203 for processor

610, it should be understood that the processor(s) 610 represent a plurality of processing cores, each of which can perform separate processing.

FIG. 7 also shows that the location fusion engine software 630 operates on a feed of location estimate information per technology, shown at reference numeral 650. The location information 650 includes ultrasound location information, BLE location information, RSSI location information, RFID reader location information, from the various sources of this information, as described above in connection with FIGS. 1-6.

The location server 110 may also include a disk controller coupled to the bus 640 to control one or more storage devices for storing information and instructions. The storage devices may be added to the location server 110 using an appropriate device interface (e.g., small computer system interface (SCSI), integrated device electronics (IDE), enhanced-IDE (E-IDE), direct memory access (DMA), or ultra-DMA.

The location server 610 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors individually, or collectively, are types of processing circuitry. The processing circuitry may be located in one device or be distributed across multiple devices.

The location server 110 performs a portion or all of the processing steps of the process in response to the processor 610 executing one or more sequences of one or more instructions contained in a memory, such as the memory 630. Such instructions may be read into the memory 630 from another computer readable medium, such as a hard disk or a removable media drive. One or more processors in a multi-processing arrangement may also be employed to execute the sequences of instructions contained in memory 630. In alternative embodiments, hard-wired circuitry may be used in place of or in combination with software instructions. Thus, embodiments are not limited to any specific combination of hardware circuitry and software.

As stated above, the location server includes at least one non-transitory computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the location server 110, for driving a device or devices for implementing the process, and for enabling the location server 110 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

A network administrator may communicate with the location server 110 to see location information about one or more target devices/assets to be tracked on a graphical screen presentation of the location region of interest. FIG. 7 shows an administrator device 700 that includes, among other components, a display 710, a keyboard 720 and a pointing device 730 (e.g., a mouse or similar component used on laptop computers). The administrator device 700 may be a desktop computer, laptop computer, hand-held device (e.g., Smartphone) with a touchscreen, etc. Alternatively, the administrator device 700 may be a limited computing platform, such as a terminal, that can connect to or log on to the location server 110 in order to present location information to a user.

The location server 110 may, in one form, be implemented in a cloud/data center networking environment by way of one or more virtual machines.

The location approach presented herein can be extended to other combinations of sensors. Sensors that operate in accordance with IEEE 802.15.4, for example, could be used in conjunction with Wi-Fi access points to limit the location search region to an area where the tracked device is within range of one or more 802.15.4 nodes. With three 802.15.4 static nodes, for example, this region might be a small triangle that describes a sub-region or zone of interest.

In summary, presented herein is a system and method for improving location precision and pervasiveness of coverage in venues with challenging conditions. By combining multiple sensors with novel hierarchical instrumentation and fusion methods, low-cost, high coverage, highly precise location results can be achieved in venues with challenging conditions, including high ceilings, RF interference, visual occlusion, and vast open spaces that have previously been difficult to cover cost effectively.

The system and method presented herein employs a hierarchical location scheme in which different types of sensors are applied in succession to achieve greater speed and accuracy of location, especially in challenging venues. Greater location accuracy can be achieved than a single technology alone. A more consistent and pervasive coverage is provided that is greatly more useful than what can be achieved using a single technology. It is more cost effective to deploy a system in a venue with a few key sensors of different types in the right locations than to "over instrument" with a single location technology to achieve the necessary accuracy and coverage. The use of ultrasound to limit a search area for other schemes like, RSSI-based location, is particularly useful. In general, a hierarchy of sensor technologies may be used to successively limit the search region to smaller and smaller areas to improve the speed and accuracy of location determination without costly, pervasive over-instrumentation.

In addition, a central location platform provides a number of advantages. The target device or asset tag can be simpler and lower cost, extending applicability to a myriad of small, low cost assets that need to be located. New sensing elements (such as video from a fixed camera viewing devices in a region) can be added without updating a client or having to change its sensors, extending location tracking to new areas and continuously improving location accuracy and speed A centralized location engine can more quickly calculate locations than a constrained end device (since not all devices may need to be tracked at once, a central location engine can harness its resources to focus on tracking assets that are critical at the moment), and speed is crucial in many applications such as danger zone detection, where a warning is needed immediately. A centralized location engine can also draw power from the grid, whereas battery life in end devices is constrained; likewise a centralized location engine is protected whereas ruggedization of more sophisticated end devices can be costly.

A centralized location engine has much wider visibility of instrumentation in the monitored area. Also, it is more flexible to update the instrumentation information at a central location.

These methods could be used in any environment where it is useful to track assets in and where Wi-Fi alone does not provide enough accuracy or is not the most cost effective solution to provide the needed accuracy. Examples of environments include manufacturing (factories, warehouses, and distribution centers), airlines (airport-wide), and retail, with applicability to all industries.

The use of ultrasound zones, which are configurable two-dimensional areas created by directed sound walls, is particularly unique in the overall combined location system. This provides greater diversity in the types of spaces for which location can be determined accurately and reduces the number of ultrasound sensors required. As explained above in connection with FIGS. 2-6, the location process presented herein takes advantage of an ordered calculation, first localizing tags accurately in an ultrasound based area (zone) and then using that both to improve Wi-Fi/RSSI-based location accuracy and to reduce location engine computation time by presenting a reduced search area.

The system presented herein provides a general sensor fusion framework based on the principle of instrumenting a space to provide the optimal combination of sensors for coverage, accuracy, and cost effectiveness, choosing the best sensors and their locations based on the business requirements and including both heuristic and machine learned algorithms in the fusion scheme.

While there is a probability that fusion could reduce accuracy for a particular location at a particular moment in time, the instrumentation and fusion schemes are designed and trained to increase accuracy and coverage on average. If RFID were to show a device on the wrong side of a wall, for example, the BLE/Wi-Fi rules might be tuned to override that error if they both indicate the opposite side of the wall. If more accurate sensor information is frequently discarded, however, location inaccuracies (e.g. a determination that an object is on the wrong side of the wall) may occur, and location jitter would also increase (e.g. keep jumping estimates across a room)—additional (perhaps time series based) filters may be applied in cases where this occurs, during tuning of the fusion algorithms.

In summary, in one form, a method is provided including: obtaining a received signal strength location estimate of a target device based on wireless transmissions made by the target device that are received at a plurality of receiver devices at known locations in a location region; deriving a first search area for the target device based on the received signal strength location estimate; deriving an ultrasound based area in which the target device is estimated to be based on reception by the target device of a particular ultrasound beacon in the location region; computing an intersection of the first search area and the ultrasound based area to produce a second search area; and computing a location estimate of the target device in the second search area based at least on the received signal strength location estimate.

In another form, an apparatus is provided comprising: a network interface unit configured to enable communications over a network; a processor coupled to the network interface unit, and configured to: obtain a received signal strength location estimate of a target device based on wireless transmissions made by the target device that are received at a plurality of receiver devices at known locations in a location region; derive a first search area for the target device based on the received signal strength location estimate; derive an ultrasound based area in which the target device is estimated to be based on reception by the target device of a particular ultrasound beacon in the location region; compute an intersection of the first search area and the ultrasound based area to produce a second search area; and compute a location estimate of the target device in the second search area based at least on the received signal strength location estimate.

In still another form, a system is provided comprising: a plurality of receiver devices configured to be positioned at known locations in a location region, and to receive wireless transmission made by a target device in the location region; a plurality of ultrasound beacons configured to be positioned in the location region; and a server configured to be in network communications with the plurality of receiver devices, the plurality of ultrasound beacons and the target device, wherein the server is configured to: obtain a received signal strength location estimate of the target device based on the wireless transmissions made by the target device that are received at the plurality of receiver devices; derive a first search area for the target device based on the received signal strength location estimate; derive an ultrasound based area in which the target device is estimated to be based on reception by the target device of a particular ultrasound beacon of the plurality of ultrasound beacons; compute an intersection of the first search area and the ultrasound based area to produce a second search area; and compute a location estimate of the target device in the second search area based at least on the received signal strength location estimate.

In yet another form, one or more non-transitory computer readable storage media are provided that are encoded with software instructions that, when executed by a processor, cause the processor to perform operations including: obtaining a received signal strength location estimate of a target device based on wireless transmissions made by the target device that are received at a plurality of receiver devices at known locations in a location region; deriving a first search area for the target device based on the received signal strength location estimate; deriving an ultrasound based area in which the target device is estimated to be based on reception by the target device of a particular ultrasound beacon in the location region; computing an intersection of the first search area and the ultrasound based area to produce a second search area; and computing a location estimate of the target device in the second search area based at least on the received signal strength location estimate.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
obtaining a received signal strength location estimate of a target device based on wireless transmissions made by the target device that are received at a plurality of receiver devices at known locations in a location region;

deriving a first search area for the target device based on the received signal strength location estimate;

deriving an ultrasound based area in which the target device is estimated to be based on reception by the target device of a particular ultrasound beacon in the location region;

computing an intersection of the first search area and the ultrasound based area to produce a second search area;

computing a first angle-of-arrival location estimate of the target device in the second search area based on a wireless signal received from the target device at each of a plurality of antennas of the plurality of receiver devices; and computing a location estimate of the target device in the second search area based at least on the received signal strength location estimate and the first angle-of-arrival location estimate.

2. The method of claim 1, further comprising:

determining whether the first angle-of-arrival location estimate is accurate;

when it is determined that the first angle-of-arrival location estimate is accurate, combining the received signal strength location estimate with the first angle-of-arrival location estimate to produce the location estimate of the target device.

3. The method of claim 2, wherein when it is determined that the first angle-of-arrival location estimate does not have sufficient accuracy, further comprising:

generating a second angle-of-arrival location estimate on a reduced search area compared to that used for the first angle-of-arrival location estimate; and combining the received signal strength location estimate with the second angle-of-arrival location estimate to produce the location estimate of the target device.

4. The method of claim 1, wherein the received signal strength location estimate is a first location measurement of the target device and a second location measurement is based on the ultrasound based area, and further includes: a third location measurement of the target device based on short-range low energy wireless beacon sensors, and a fourth location measurement of the target device based on a detection event from a radio frequency identification (RFID) reader position in the location region to detect the target device on opposite sides of a wall, and wherein computing the location estimate comprises computing a fused location estimate based on a weighted combination of the first location measurement and the third location measurement.

5. The method of claim 4, wherein when deriving the ultrasound based area in which the target device is estimated to be determines that the target device is not estimated to be in the ultrasound based area, further comprising:

determining whether the fourth location measurement of the target device indicates that the target device is on a same side of a building structure as the RFID reader.

6. The method of claim 5, wherein when the fourth location measurement of the target device indicates that the target device is on an opposite side of the building structure from the fused location estimate, computing the location estimate comprises modifying the fused location estimate as being on a line from the fused location estimate normal to the building structure but on a correct side of the building structure.

7. The method of claim 4, wherein when the deriving the ultrasound based area in which the target device is estimated to be in determines that the target device is estimated to be in the ultrasound based area, further comprising:

determining whether the fused location estimate is in the ultrasound based area; and if the fused location estimate is in the ultrasound based area, using the fused location estimate without modification.

8. The method of claim 5, wherein if the fused location estimate is not in the ultrasound based area but is on a same side of the building structure as the ultrasound based area, further comprising:

determining whether the fused location estimate is on the same side of the building structure as the RFID reader.

9. The method of claim 8, further comprising:

modifying the fused location estimate to be at a point that is on a correct side of the building structure approximately mid-way between intersections with the building structure of perpendicular lines from the fused location estimate and a centroid of the ultrasound based area, when it is determined that the fused location estimate is not on the same side of the building structure as the RFID reader; and modifying the fused location estimate to be at a point on a boundary of the ultrasound based area and on a line between the fused location estimate and the centroid of the ultrasound based area when it is determined that the fused location estimate is on the same side of the building structure as the RFID reader.

10. The method of claim 8, wherein if the fused location estimate is not in the ultrasound based area but is on an opposite side of the building structure as the ultrasound based area, further comprising:

modifying the fused location estimate to be at a point that is on a correct side of the building structure approximately mid-way between intersections with the building structure of perpendicular lines from the fused location estimate and the centroid of the ultrasound based area, when it is determined that the fused location estimate is not on the same side of the building structure as the RFID reader; and not modifying the fused location estimate when it is determined that the fused location estimate is on the same side of the building structure as the RFID reader.

11. An apparatus comprising:

a network interface unit configured to enable communications over a network;

a processor coupled to the network interface unit, and configured to:

obtain a received signal strength location estimate of a target device based on wireless transmissions made by the target device that are received at a plurality of receiver devices at known locations in a location region;

derive a first search area for the target device based on the received signal strength location estimate;

derive an ultrasound based area in which the target device is estimated to be based on reception by the target device of a particular ultrasound beacon in the location region;

compute an intersection of the first search area and the ultrasound based area to produce a second search area;

compute a first angle-of-arrival location estimate of the target device in the second search area based on a wireless signal received from the target device at each of a plurality of antennas of the plurality of receiver devices; and compute a location estimate of the target device in the second search area based at least on the received signal strength location estimate and the first angle-of-arrival location estimate.

12. The apparatus of claim 11, wherein the processor is configured to:
generate a second angle-of-arrival location estimate on a reduced search area compared to a size of the second search area for the first angle-of-arrival location estimate; and
combine the received signal strength location estimate with the second angle-of-arrival location estimate to produce the location estimate of the target device.

13. The apparatus of claim 11, wherein the received signal strength location estimate is a first location measurement of the target device and a second location measurement is based on the ultrasound based area, and wherein the processor is configured to:
obtain a third location measurement of the target device based on short-range low energy wireless beacon sensors, and a fourth location measurement of the target device based on a detection event from a radio frequency identification (RFID) reader position in the location region to detect the target device on opposite sides of a wall, and
compute the location estimate by computing a fused location estimate based on a weighted combination of the first location measurement and the third location measurement.

14. The apparatus of claim 13, wherein when it is determined that the target device is not estimated to be in the ultrasound based area, the processor is configured to:
determine whether the fourth location measurement of the target device indicates that the target device is on a same side of a building structure as the RFID reader.

15. A system comprising:
a plurality of receiver devices configured to be positioned at known locations in a location region, and to receive wireless transmission made by a target device in the location region;
a plurality of ultrasound beacons configured to be positioned in the location region; and
a server configured to be in network communications with the plurality of receiver devices, the plurality of ultrasound beacons and the target device, wherein the server is configured to:
obtain a received signal strength location estimate of the target device based on the wireless transmissions made by the target device that are received at the plurality of receiver devices;
derive a first search area for the target device based on the received signal strength location estimate;
derive an ultrasound based area in which the target device is estimated to be based on reception by the target device of a particular ultrasound beacon of the plurality of ultrasound beacons;
compute an intersection of the first search area and the ultrasound based area to produce a second search area;
compute a first angle-of-arrival location estimate of the target device in the second search area based on a wireless signal received from the target device at each of a plurality of antennas of the plurality of receiver devices; and
compute a location estimate of the target device in the second search area based at least on the received signal strength location estimate and the first angle-of-arrival location estimate.

16. The system of claim 15, wherein the server is configured to:
generate a second angle-of-arrival location estimate on a reduced search area compared to that used for the first angle-of-arrival location estimate; and
combine the received signal strength location estimate with the second angle-of-arrival location estimate to produce the location estimate of the target device.

17. The system of claim 16, wherein the received signal strength location estimate is a first location measurement of the target device and a second location measurement is based on the ultrasound based area, and wherein the server is configured to:
obtain a third location measurement of the target device based on short-range low energy wireless beacon sensors, and a fourth location measurement of the target device based on a detection event from a radio frequency identification (RFID) reader position in the location region to detect the target device on opposite sides of a wall, and
compute the location estimate by computing a fused location estimate based on a weighted combination of the first location measurement and the third location measurement.

18. The system of claim 17, wherein when it is determined that the target device is not estimated to be in the ultrasound based area, the server is configured to:
determine whether the fourth location measurement of the target device indicates that the target device is on a same side of a building structure as the RFID reader.

19. The apparatus of claim 14, wherein when the fourth location measurement of the target device indicates that the target device is on an opposite side of the building structure from the fused location estimate, wherein the processor is configured to compute the location estimate by modifying the fused location estimate as being on a line from the fused location estimate normal to the building structure but on a correct side of the building structure.

20. The apparatus of claim 14, wherein if the fused location estimate is not in the ultrasound based area but is on a same side of a building structure as the ultrasound based area, the processor is further configured to:
determine whether the fused location estimate is on the same side of the building structure as the RFID reader.

21. The system of claim 18, wherein when the fourth location measurement of the target device indicates that the target device is on an opposite side of the building structure from the fused location estimate, the server is configured to compute the location estimate by modifying the fused location estimate as being on a line from the fused location estimate normal to the building structure but on a correct side of the building structure.

* * * * *